(12) United States Patent
Kasazumi

(10) Patent No.: US 7,646,518 B2
(45) Date of Patent: Jan. 12, 2010

(54) TWO DIMENSIONAL IMAGE FORMING DEVICE

(75) Inventor: Kenichi Kasazumi, Osaka (JP)

(73) Assignee: Panasonic Corporation, Osaka (JP)

( * ) Notice: Subject to any disclaimer, the term of this patent is extended or adjusted under 35 U.S.C. 154(b) by 165 days.

(21) Appl. No.: 11/884,951

(22) PCT Filed: Feb. 21, 2006

(86) PCT No.: PCT/JP2006/003015

§ 371 (c)(1),
(2), (4) Date: Aug. 23, 2007

(87) PCT Pub. No.: WO2006/090681

PCT Pub. Date: Aug. 31, 2006

(65) Prior Publication Data

US 2008/0165401 A1    Jul. 10, 2008

(30) Foreign Application Priority Data

Feb. 25, 2005    (JP)    ............... 2005-050414

(51) Int. Cl.
G02B 26/08    (2006.01)
(52) U.S. Cl. .................... 359/196.1; 359/707
(58) Field of Classification Search ............ 359/196.1, 359/712, 212, 707
See application file for complete search history.

(56) References Cited

U.S. PATENT DOCUMENTS

| 6,005,722 | A | * | 12/1999 | Butterworth et al. | ........ 359/712 |
|---|---|---|---|---|---|
| 6,317,169 | B1 | | 11/2001 | Smith | |
| 6,594,090 | B2 | | 7/2003 | Kruschwitz et al. | |
| 7,113,657 | B2 | | 9/2006 | Park | |
| 2003/0039036 | A1 | | 2/2003 | Kruschwitz et al. | |
| 2003/0142277 | A1 | | 7/2003 | Hatakeyama et al. | |
| 2004/0239889 | A1 | | 12/2004 | Inamoto | |
| 2004/0247222 | A1 | | 12/2004 | Park | |

FOREIGN PATENT DOCUMENTS

| EP | 1 489 457 | 12/2004 |
|---|---|---|
| JP | 7-297111 | 11/1995 |
| JP | 11-64789 | 3/1999 |
| JP | 2000-131665 | 5/2000 |
| JP | 2000-347291 | 12/2000 |
| JP | 2002-543455 | 12/2002 |
| JP | 2003-98476 | 4/2003 |
| JP | 2004-138669 | 5/2004 |
| JP | 2004-295130 | 10/2004 |
| JP | 2005-10772 | 1/2005 |

\* cited by examiner

*Primary Examiner*—Euncha P Cherry
(74) *Attorney, Agent, or Firm*—Wenderoth, Lind & Ponack L.L.P.

(57) ABSTRACT

A two dimensional image forming device includes a laser light source which is a coherent light source; a prism array that changes the traveling direction of a beam exiting from the laser light source; a driving portion that rotates the prism array; a rod integrator that guides the exiting beam deflected on the prism array while allowing the beam to undergo internal reflection; a projection optical system that projects the exiting end face of the rod integrator onto a two dimensional spatial light modulation element; and a projection lens that projects light exiting from the two dimensional spatial light modulation element onto a specific plane within a space.

7 Claims, 16 Drawing Sheets

TWO DIMENSIONAL IMAGE FORMING DEVICE

BACKGROUND OF THE INVENTION

1. Technical Field

The present invention relates to a two dimensional image forming device using a coherent light source as a light source. More particularly, the present invention relates to a two dimensional image forming device having means for reducing speckle noises appearing within the display.

2. Background Art

FIG. 16 schematically shows the configuration of a conventional laser display. Each of light beams from laser light sources 101a through 101c for three colors in RGB is expanded by a beam expander 102 and irradiated to a two dimensional spatial light modulation element 107 by a light integrator 103. The light integrator 103 is a fly's eye lens in which rectangular unit lenses are arrayed two dimensionally, and a light intensity distribution of substantially the Gaussian distribution forms an almost uniform rectangular shape on the two dimensional spatial light modulation element 107 so as to irradiate the two dimensional spatial light modulation element 107 at uniform intensity. A diffusing, plate 105 is disposed in front of the two dimensional spatial light modulation element 107 and rotated in-plane by a diffusing plate oscillation portion 112. The respective rays of light having passed through the corresponding two dimensional spatial light modulation elements 107 are combined by a dichroic prism 110 and projected onto a screen 108 by a projection lens 109 in the form of a full-color video.

A laser display as above is characterized in that a highly monochromatic laser light source is used as a light source. In a projector using a lamp, because light having a continuous spectrum of a lamp light source is separated to three colors in RGB, each ray of RGB light has a continuous spectrum distribution, which makes it impossible to display a pure single color. On the contrary, because the laser display uses a monochromatic light source, it is possible to display a sharp image having high color purity.

Incidentally, a problem with the display as above is so-called speckle noises occurring due to the use of a laser light source having high coherency as a light source. Speckle noises are minute irregular noises generated when laser light is scattered on the screen 108 as rays of scattering light from the respective portions on the screen 108 interfere with one another. In order to suppress the speckle noises, as has been described using FIG. 16, the conventionally proposed laser display has the configuration to oscillate the diffusing plate 105.

More specifically, the diffusing plate 105 is processed to have a ground glass surface, and confers random phase modulations to light coming incident thereon. A parallel beam coming incident on the diffusing plate 105 becomes scattering light scattered randomly within a specific angle. Light having passed through the diffusing plate 105 generates random speckle noises on the two dimensional spatial light modulation element 107. By oscillating the diffusing plate 105 in-plane, speckle noises on the two dimensional spatial light modulation element 107 change at a high speed, and speckle noises of an image projected on the screen 108 change at a high speed as well. When viewed by human eyes, speckle noises changing at a high speed are time-averaged and acknowledged as a noiseless smooth image.

The configuration described above, however, has an issue that part of light scattered on the diffusing plate 105 is lost. Hereinafter, how such an issue arises will be described in detail.

In order to suppress speckle noises more effectively, an angle of diffusion of light on the diffusing plate 105 is increased. In this instance, the angle of incidence of light irradiating the two dimensional spatial light modulation element 107 becomes larger, which increases the angle of incidence on the screen 108 of light irradiating the screen 108. Because speckle patterns generated from moment to moment depend on the angle of incidence on the screen 108, many more speckle patterns are generated as light goes incident at a larger angle, and they are averaged more effectively.

When the angle of diffusion is increased as descried above, light irradiating the outside of the image frame of the two dimensional spatial light modulation element 107 and light eclipsed at the pupil of the projection lens 109 are increased, which makes up a loss of light. By making a distance between the two dimensional light modulation element 107 and the diffusing plate 105 smaller, it is possible to lessen light irradiating the outside of the image frame of the two dimensional spatial light modulation element 107 on the one hand, but on the other hand, an image of the granular pattern of the diffusing plate 105 is formed on the screen 108 and noises other than the speckle noises are generated. Hence, it is necessary to secure a specific interval as the distance between the two dimensional spatial light modulation element 107 and the diffusing plate 105, and it is therefore impossible to eliminate light that deviates to the outside of the image frame of the two dimensional spatial light modulation element 107.

Meanwhile, it is possible to prevent a loss of light resulting from the eclipse on the projection lens 109 by setting the angle of diffusion on the diffusing plate 105 to or lower than the brightness (F value) of the projection lens 109. However, from the diffusing characteristics of the diffusing plate 105, an exiting light intensity distribution with respect to the angle of diffusion is normally a distribution like the Gaussian function. Hence, the eclipse on the projection lens 109 increases as the angle of diffusion is set larger.

In addition, because light intensity of a beam is made homogeneous using the light integrator 103 in the laser display described above, the light integrator 103 requires an optical path length to some extent, which makes the light integrator 103 longer. Also, because a beam coming incident on the light integrator 103 is expanded by the beam expander 102, the beam diameter becomes larger, too. This raises a need to use the beam expander 102 and the light integrator 103 having a large diameter. Consequently, the beam expander 102 and the light integrator 103 are increased in size and so is the optical system, which makes it difficult to reduce the laser display in size.

Patent Document 1: JP-A-7-297111

SUMMARY OF THE INVENTION

An object of the invention is to provide a two dimensional image forming device capable of not only reducing speckle noises but also lessening a loss of light, and further achieving a reduction of the optical system in size.

A two dimensional image forming device according to one aspect of the invention includes: at least one laser light source; beam deflection means for changing a traveling direction of a light beam emitted from the laser light source; driving means for driving the beam deflection means to change timewise a traveling direction of the light beam exiting from the beam deflection means; a rod integrator that guides the light beam deflected by the beam deflection means to an exiting end thereof while allowing the light beam to undergo internal reflection; a first projection optical system that projects the light beam exiting from the rod integrator; a two dimensional spatial light modulation element that modulates the light beam exiting from the first projection optical system; and a second projection optical system that projects light exiting from the two dimensional spatial light modulation element onto a specific plane.

In the two dimensional image forming device, not only is it possible to reduce speckle noises, but it is also possible to lessen a loss of light, and further, the optical system can be reduced in size.

DETAILED DESCRIPTION OF THE INVENTION

Hereinafter, two dimensional image forming devices according to respective embodiments of the invention will be described with reference to the drawings.

FIRST EMBODIMENT

Figure 1:
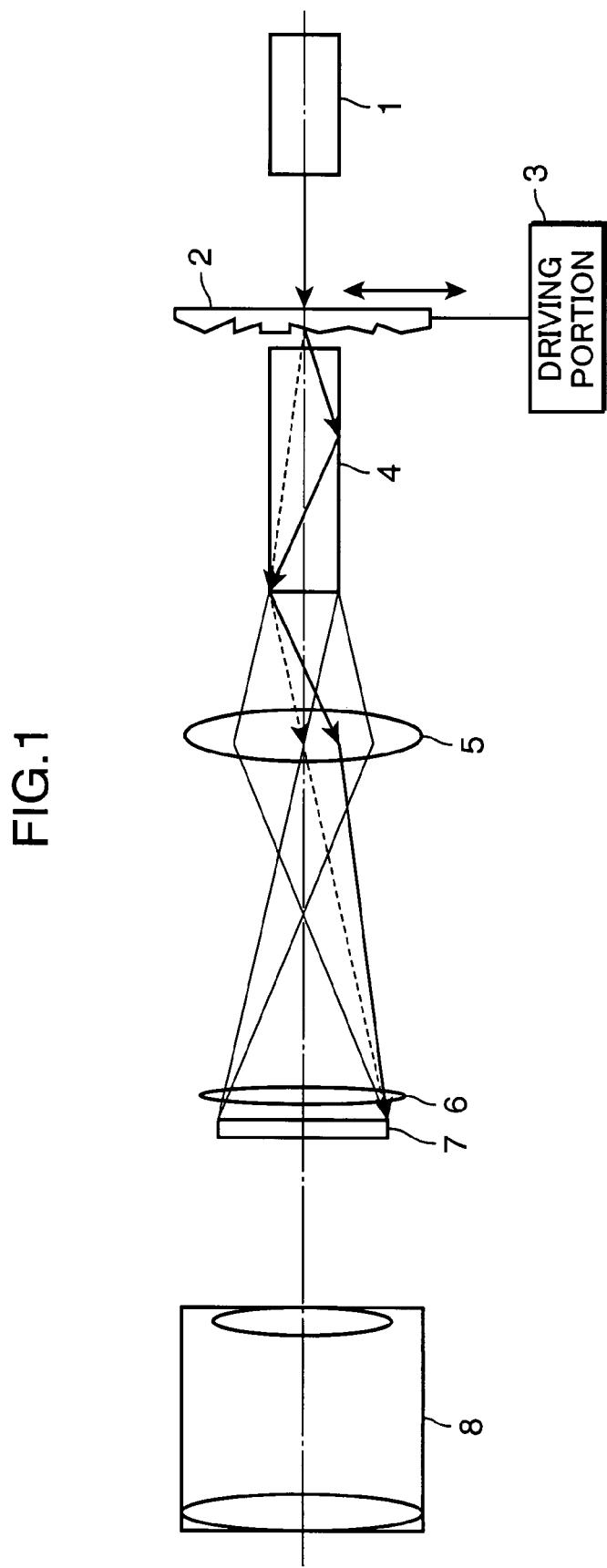
FIG. 1 is a view schematically showing the configuration of a two dimensional image forming device according to a first embodiment of the invention.

FIG. 1 is a view schematically showing the configuration of a two dimensional image forming device according to a first embodiment of the invention. The two dimensional image forming device shown in FIG. 1 includes a laser light source 1, a prism array 2, a driving portion 3, a rod integrator 4, a projection optical system 5, a field lens 6, a two dimensional spatial light modulation element 7, and a projection lens 8.

A light beam emitted from the laser light source 1, which is a coherent light source, passes through the prism array 2 and goes incident on the rod integrator 4. The light beam having undergone internal reflection repetitively inside the rod integrator 4 and eventually reached the exiting end thereof is projected onto the transmissive two dimensional spatial light modulation element 7 by the projection optical system 5 via the field lens 6. The two dimensional spatial light modulation element 7 is formed of liquid crystal shutters or the like, and modulates a beam exiting from the projection optical system 5 according to an image to be displayed and guides the beam to the projection lens 8 by controlling the opening and closing actions of the respective shutters according to image data outputted from a signal processing circuit (not shown in the drawing). The projection lens 8 projects light exiting from the two dimensional spatial light modulation element 7 onto a screen (not shown in the drawing).

Because a light beam projected onto the two dimensional spatial light modulation element 7 by the projection optical system 5 is substantially a scattering beam as is shown in FIG. 1, the field lens 6 converts the substantially scattering beam to a converging beam, so that light having passed through the two dimensional spatial light modulation element 7 goes incident on the projection lens 8 efficiently.

Figure 2:
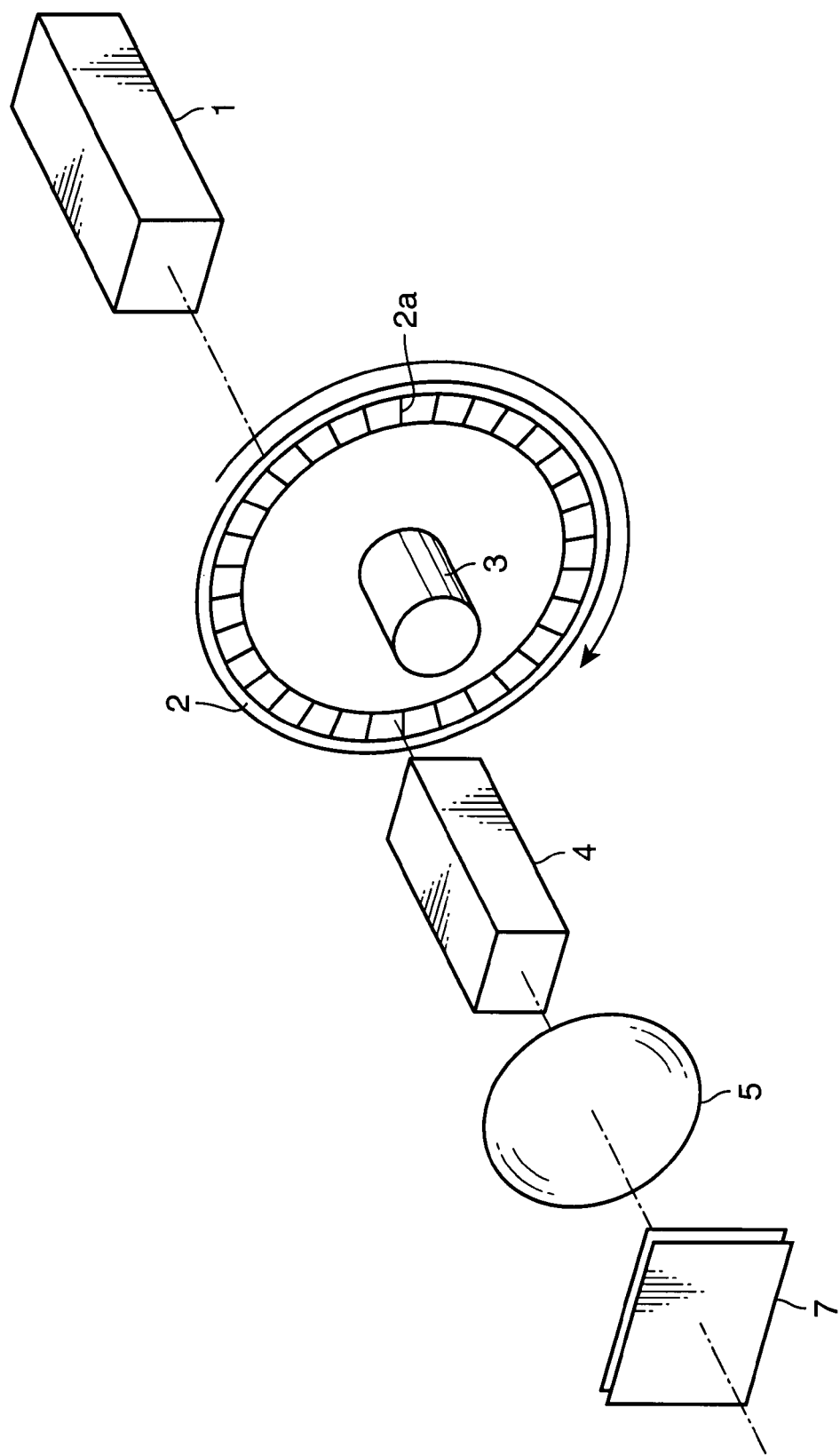
FIG. 2 is a schematic perspective view used to describe chiefly the configuration of a prism array shown in FIG. 1.

FIG. 2 is a schematic perspective view used to describe chiefly the configuration of the prism array shown in FIG. 1. As is shown in FIG. 2, the prism array 2 is formed of a circular disc on which microscopic prisms are arrayed two dimensionally, for example, microscopic unit prisms 2a are aligned on the circumference, and it is driven by a driving portion 3 formed of a motor or the like, so that a light beam is deflected continuously by different unit prisms 2a. The surface of each unit prism 2a is oriented in a different direction, and a light beam is deflected in a different direction by a different unit prism 2a.

In this manner, because a light beam is deflected in various directions while passing through a large number of unit prisms 2a per unit time in association with rotations of the prism array 2, the beam position changes at a high speed on the output end face of the rod integrator 4, which makes the average light irradiation power by time uniform within the output end face. In order to enhance the uniformity further, the surface of each unit prism 2a is formed in the shape of a concave lens, so that a deflected light beam slightly becomes a scattering beam for a light beam at the output end face of the rod integrator 4 to be of a specific size or larger.

In this instance, the angle of incidence of a light beam irradiating the two dimensional spatial light modulation element 7 varies from moment to moment, and as a consequence, the angle of incidence on the screen of a light beam irradiating the screen varies, which can in turn suppress the speckle noises efficiently.

The point of the optical system of this embodiment is that the angle of deflection of a light beam can be designed precisely owing to the use of the prism array 2 to deflect a light beam. For example, when the magnification of the projection optical system 5 is two times and the brightness of the projection lens 8 is 2.5, then, by setting the F value of light exiting from the rod integrator 4 to 1.25 or smaller, all the light beams pass through the inside of the pupil of the projection lens 8. It is thus possible to achieve an optical system having no loss of light resulting from the eclipse.

The rod integrator 4 is a rectangular optical prism. Because the slant angle of light is saved when light propagates from the incident end to the exiting end due to internal reflection, it is sufficient to design the angle of deflection on the prism array 2 so that the slant angle of a light beam coming incident on the rod integrator 4 is equal to or smaller than an angle comparable to the F value of 1.25.

When beam position displacement on the incident end face of the rod integrator 4 resulting from deflection at the unit prisms 2a is made smaller than the size of the incident end face of the rod integrator 4 by bringing the rod integrator 4 and the prism array 2 at a sufficiently close distance, all the light beams deflected at the prism array 2 go incident on the rod integrator 4 and irradiate the two dimensional spatial light modulation element 7. Hence, there is generated no light such that irradiates the outside of the image frame of the two dimensional spatial light modulation element 7 only to be lost as generated in the conventional case. It is thus possible to achieve an optical system having an extremely small loss of light.

As has been described, in this embodiment, because neither light eclipsed at the pupil of the projection lens 8 nor light irradiating the outside of the image frame of the two dimensional spatial light modulation element 7 only to be lost is generated, it is possible to achieve an optical system having an extremely small loss of light.

Also, in this embodiment, because the intensity distribution of a light beam emitted form the laser light source 1 is made constant using the rod integrator 4 of a small size without expanding the light beam, the need to use a beam expander and a light integrator of a large size can be eliminated. It is thus possible to reduce the optical system in size, which can in turn reduce the two dimensional image forming device in size.

SECOND EMBODIMENT

Figure 3:
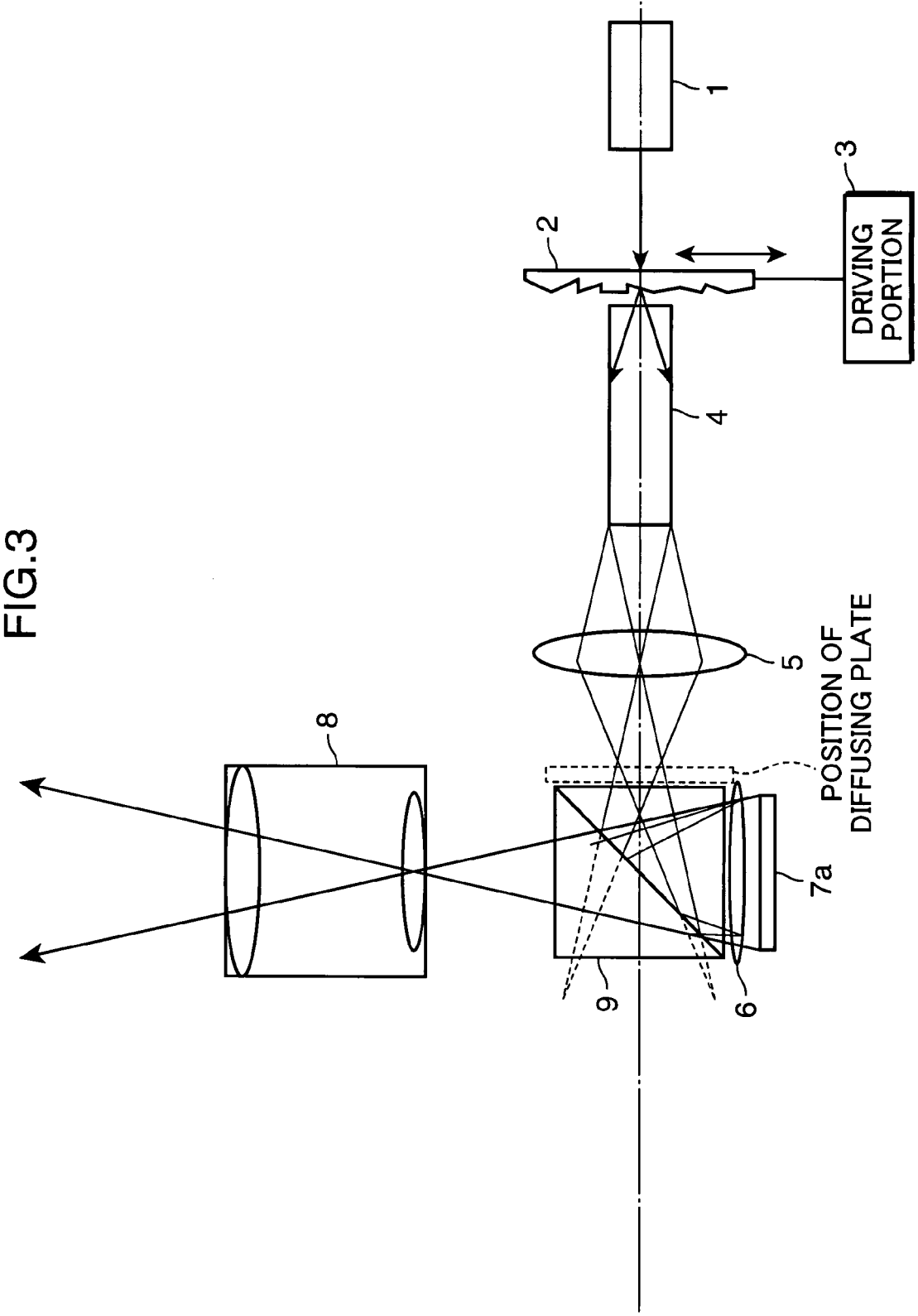
FIG. 3 is a view schematically showing the configuration of a two dimensional image forming device according to a second embodiment of the invention.

FIG. 3 is a view schematically showing the configuration of a two dimensional image forming device according to a second embodiment of the invention. A difference between the two dimensional image forming device shown in FIG. 3 and the two dimensional image forming device shown in FIG. 1 is that a polarization beam splitter 9 is additionally provided, the transmissive two dimensional spatial light modulation element 7 is replaced with a reflective two dimensional spatial light modulation element 7a, and the projection lens 8 is disposed above the polarization beam splitter 9. Because the rest is the same as the two dimensional image forming device shown in FIG. 1, like portions are labeled with like reference numerals and detailed descriptions thereof are omitted herein.

The reflective two dimensional spatial light modulation element 7a is formed of, for example, a two dimensional spatial light modulation element called an LCOS (Liquid Crystal On Silicon) formed by providing ferroelectric liquid crystals on a silicon substrate. In the LCOS two dimensional spatial light modulation element, optical switches are arrayed two dimensionally and the polarization direction of reflected light is rotated according to an input signal. Hence, of rays of incident light reflected on the polarization beam splitter 9, rays of light coming incident on the optical switches in an ON state are reflected as the polarization directions thereof are rotated and go incident on the projection lens 8 by passing through the polarization beam splitter 9.

In a case where the method of preventing speckle noises by disposing the diffusing plate in the closest proximity to the reflective two dimensional spatial light modulation element 7a as in the conventional case is applied to this optical system, the diffusing plate is disposed at a position of the rectangle indicated by a broken line in FIG. 3. This is because when the diffusing plate is disposed between the reflective two dimensional spatial light modulation element 7a and the projection lens 8, an image projected onto the screen becomes blur, and it is therefore impossible to dispose the diffusing plate in an optical path through which travels the reflected light from the reflective two dimensional spatial light modulation element 7a.

Hence, because the polarization beam splitter 9 is present between the diffusing plate and the reflective two dimensional spatial light modulation element 7a and the optical path becomes longer, most of the rays of light diffused on the diffusing plate deviate to the outside of the image frame of the reflective two dimensional spatial light modulation element 7a. In a case where the reflective two dimensional spatial light modulation element 7a and the diffusing plate are used in combination as above, a loss of light becomes particularly large. On the contrary, in this embodiment, in addition to the effect of the first embodiment, it is possible to prevent a drop in amount of light because there is no need to dispose the diffusing plate in front of the reflective two dimensional spatial light modulation element 7a. The invention is therefore particularly effective when a reflective two dimensional spatial light modulation element is used.

THIRD EMBODIMENT

Figure 4:
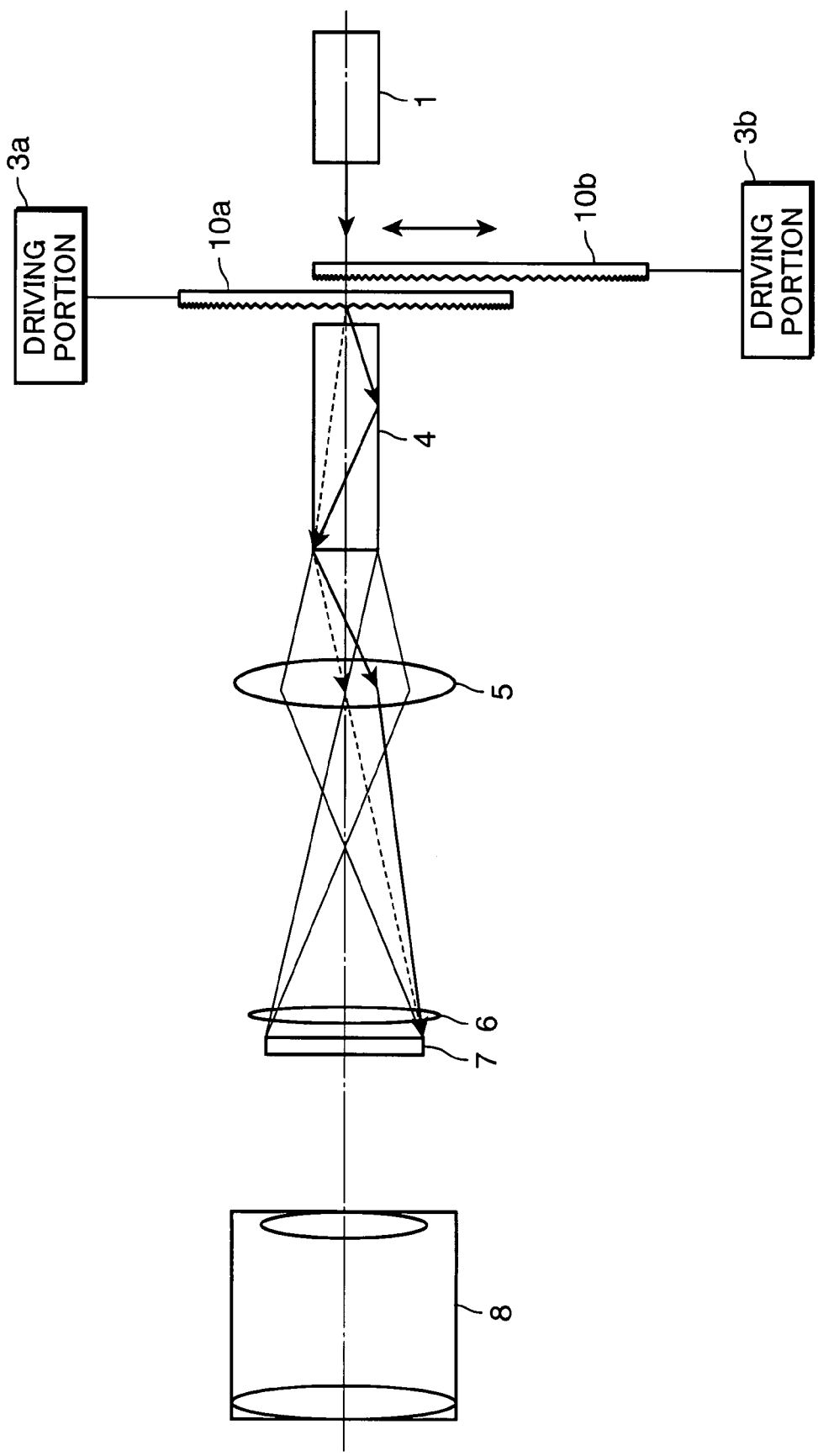
FIG. 4 is a view schematically showing the configuration of a two dimensional image forming device according to a third embodiment of the invention.
Figure 5:
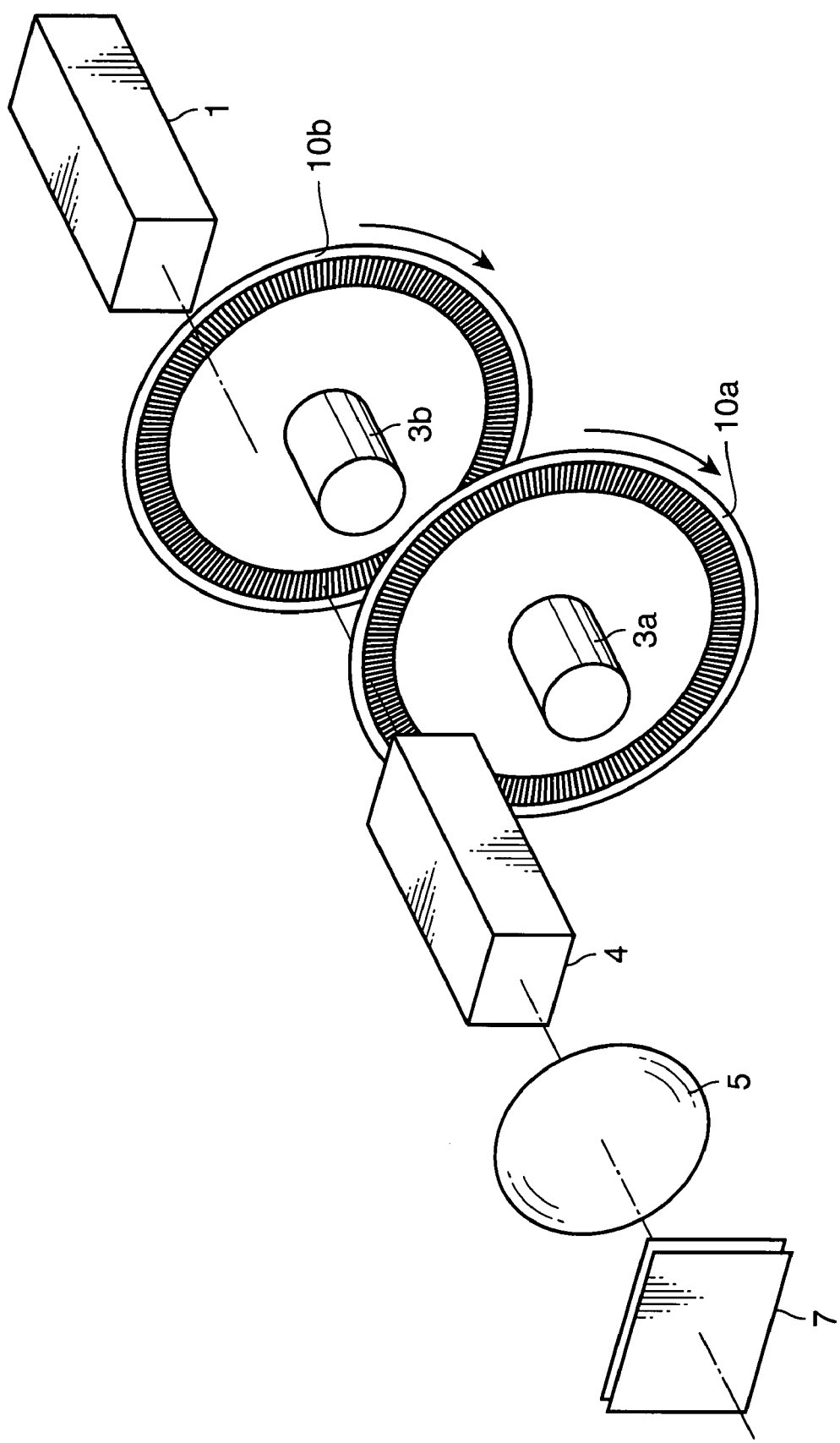
FIG. 5 is a schematic perspective view used to describe chiefly the configuration of a lenticular lens shown in FIG. 4.

FIG. 4 is a view schematically showing the configuration of a two dimensional image forming device according to a third embodiment of the invention. FIG. 5 is a schematic perspective view used to describe chiefly the configuration of a lenticular lens shown in FIG. 4. In this embodiment, a light beam is deflected by disposing two lenticular lenses 10a and 10b respectively rotated by two driving portions 3a and 3b in a space from the laser light source 1 to the rod integrator 4. Because the rest is the same as the two dimensional image forming device shown in FIG. 1, like portions are labeled with like reference numerals and detailed descriptions thereof are omitted herein.

Each of the lenticular lenses 10a and 10b used in this embodiment forms a lenticular lens by forming smooth concavo-convex shapes like a corrugated plate on a circular ring area of a circular disc substrate. The concavo-convex shapes are disposed so that the direction of the concavo-convex shapes is oriented in the radial direction of the circular disc substrate. Hence, the lenticular lenses 10a and 10b have a cross section of smooth concavo-convex shapes like a corrugated plate, and deflect an incident light beam in a direction perpendicular to the concavo-convex shapes.

The lenticular lenses 10a and 10b are rotated in-plane about the center of the circular disc substrate as the center of rotation, respectively, by the driving portions 3a and 3b formed of motors or the like. Each time an incident light beam traverses the concavo-convex shapes of the lenticular lenses 10a and 10b, the light beam is repetitively deflected in a direction perpendicular to the concavo-convex shapes. In this instance, the lenticular lenses 10a and 10b are disposed as is shown in the drawing; two lenticular lenses 10a and 10b are used in such a manner that the lenticular lens 10a deflects incident light in a horizontal direction while the other lenticular lens 10b deflects incident light in a vertical direction. The depth and the cycle of the concavo-convex shapes of each of the lenticular lenses 10a and 10b are designed so that the angle of inclination will not cause the eclipse on the projection lens 8.

One of the characteristics of the two dimensional image forming device of this embodiment is that there is no loss resulting from scattering of light because the surfaces of the lenticular lenses 10a and 10b are formed of a continuous plane and have no discontinuity. For example, in the prism array 2 used in the first embodiment, the surface shape becomes discontinuous at the boundary line of a prism and an adjacent prism, and when a light beam irradiates on this discontinuous line, a loss is generated as light is scattered, albeit slightly. On the contrary, the surface shape of the lenticular lenses 10a and 10b is smooth and no light scatters on the boundary line. It is thus possible to achieve an optical system having a small loss.

Another characteristic of the two dimensional image forming device of this embodiment is that the polarization direction of light passing through the lenticular lenses 10a and 10b remains intact. For example, in a case where a liquid crystal two dimensional spatial light modulation element is used as the two dimensional spatial light modulation element 7, a light beam passes through a polarization isolation element before and after it goes incident on the two dimensional spatial light modulation element 7.

For example, in the configuration of FIG. 3, the polarization beam splitter 9 is provided adjacently to the reflective two dimensional spatial light modulation element 7a. The polarization components in one direction alone are reflected on the polarization beam splitter 9 to go incident on the reflective two dimensional spatial light modulation element 7a, and the polarization direction thereof changes according to an input signal. Light whose polarization direction has been changed is projected onto the screen from the projection lens 8 by passing through the polarization beam splitter 9. When light coming incident on the polarization beam splitter 9 from the rod integrator 4 is not linearly polarized light and includes unwanted polarization components, the unwanted polarization components pass through the polarization beam splitter 9 as indicated by a dotted line in FIG. 3 and become a loss of light instead of going incident on the reflective two dimensional spatial light modulation element 7a.

Figure 16:
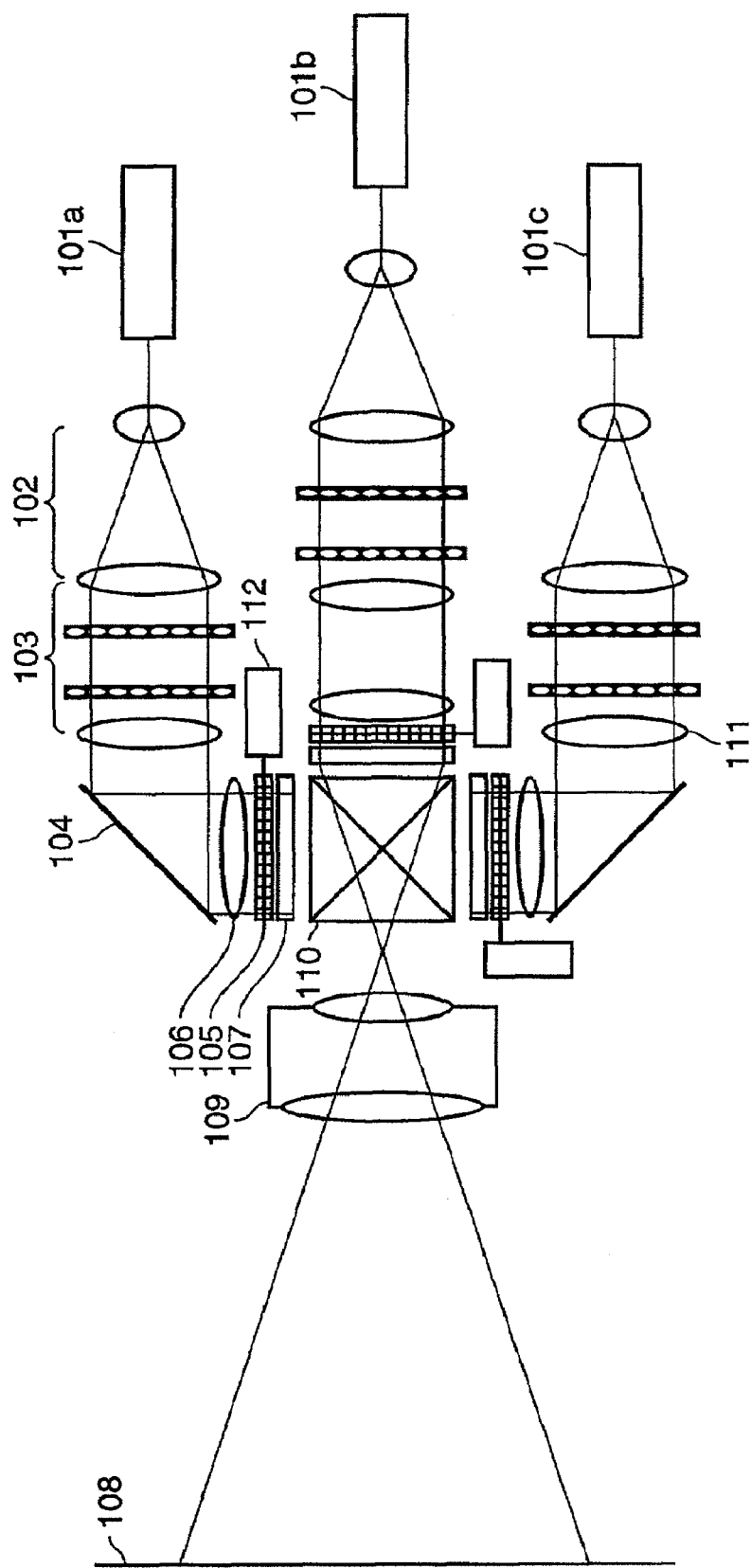
FIG. 16 is a view schematically showing the configuration of a conventional laser display.

Also, in a case where the transmissive two dimensional spatial light modulation element 7 is used as is shown in FIG. 4, when the liquid crystal two dimensional spatial light modulation element is used, polarizers (not shown in the drawing) are disposed on the incident side and the exiting side of the liquid crystal two dimensional spatial light modulation element. Hence, unwanted polarization components are absorbed in the polarizer on the incident side, and as with the case of using the reflective liquid crystal spatial light modulation element 7a, unwanted polarization components become a loss of light. On the contrary, light from the laser light source 1 is, for example, linearly polarized light in the horizontal direction and the inclined directions of the surfaces of the two lenticular lenses 10a and 10b described above are vertical direction and the horizontal direction. Hence, the polarization direction does not change when light is deflected on the lenticular lenses 10a and 10b, which allows linearly polarized light to go incident on the two dimensional spatial light modulation element 7. It is thus possible to achieve a lossless optical system. In the optical system in the conventional case shown in FIG. 16, the polarization direction of light having passed through the diffusing plate 105 is slightly disturbed and unwanted polarization components are generated, which makes up a loss of light.

FOURTH EMBODIMENT

Figure 6:
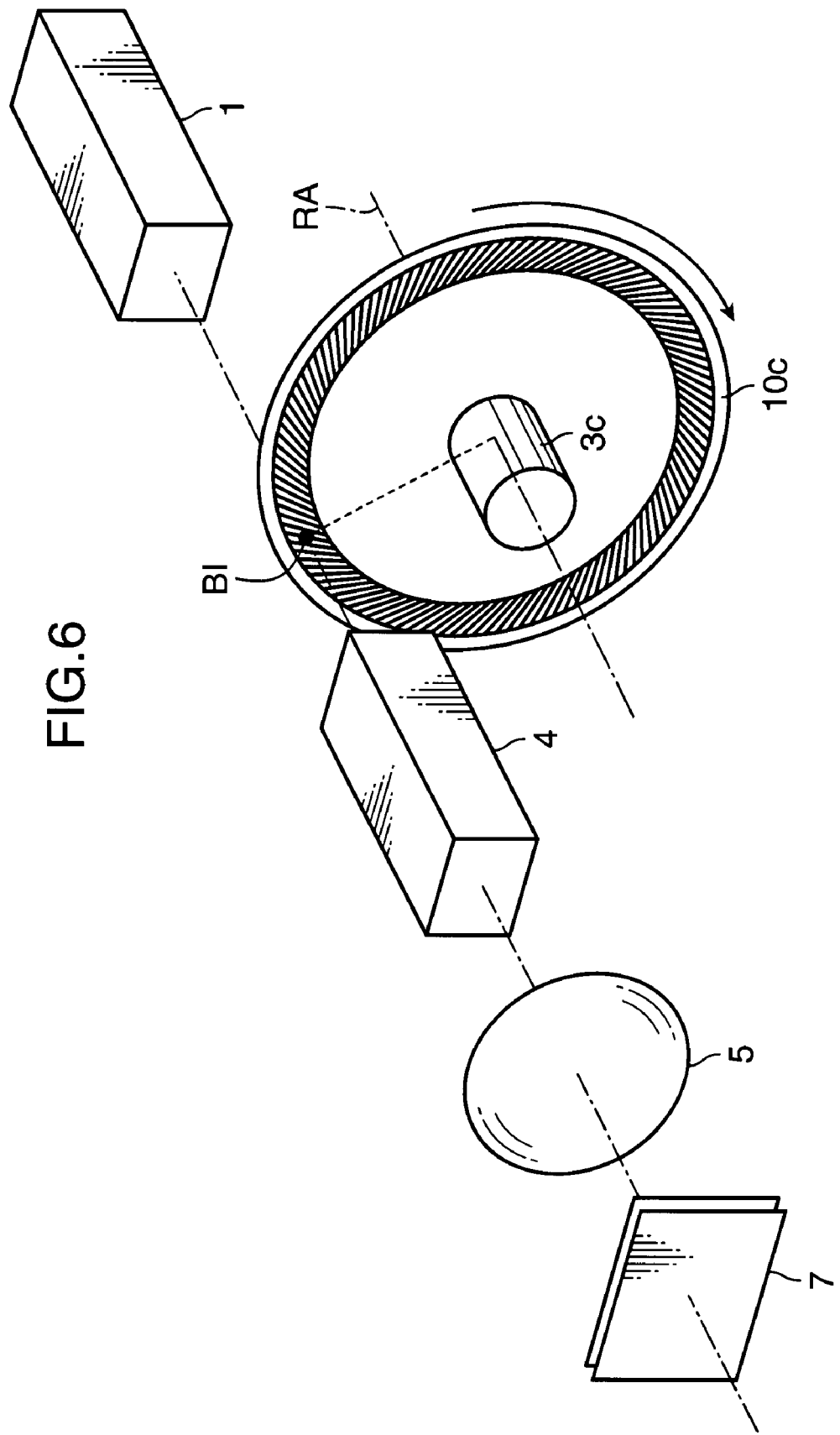
FIG. 6 is a view schematically showing the configuration of a two dimensional image forming device according to a fourth embodiment of the invention.
Figure 7:
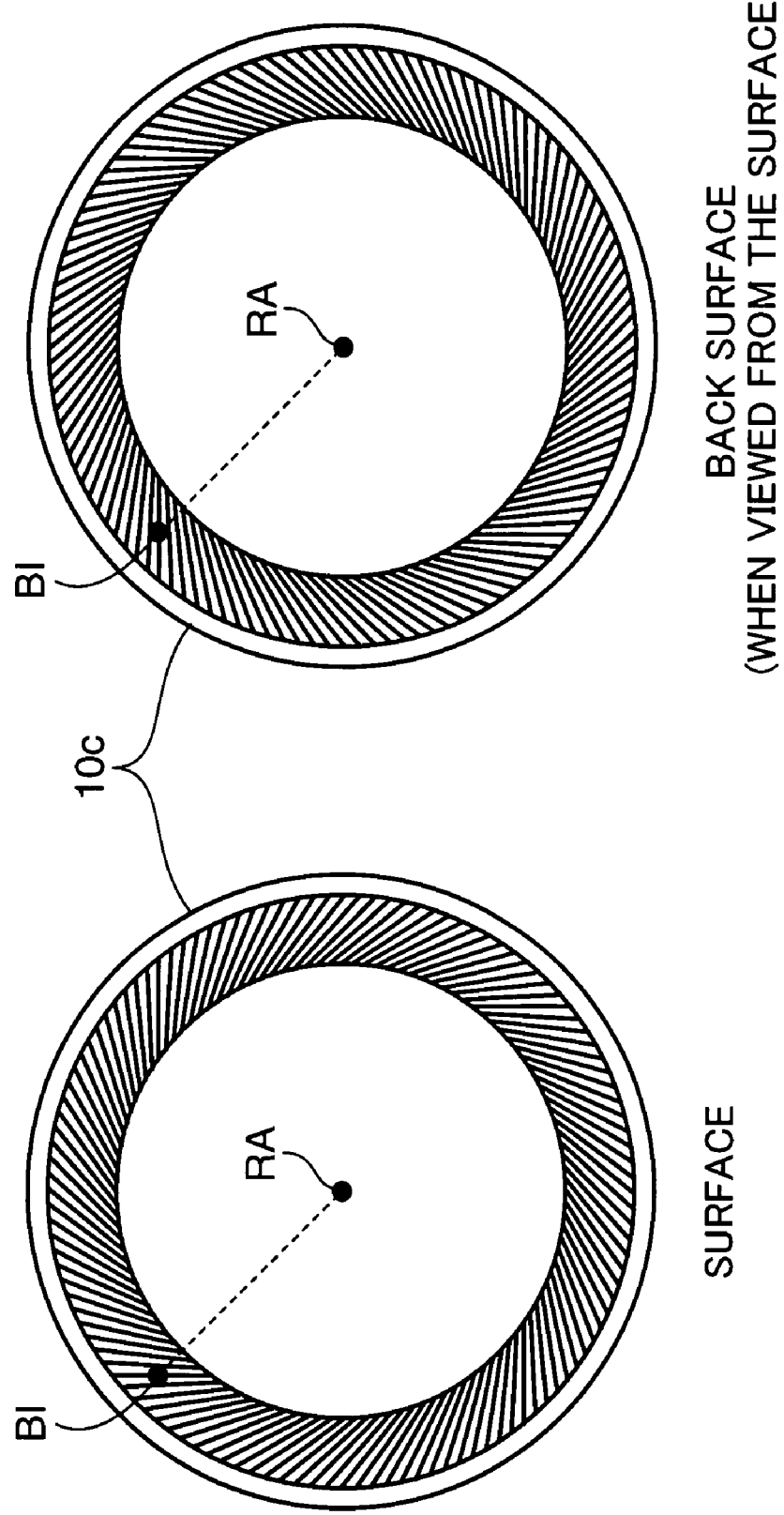
FIG. 7 is a view showing the arrangement of concavo-convex shapes of the lenticular lens in the two dimensional image forming device shown in FIG. 6.

FIG. 6 is a view schematically showing the configuration of a two dimensional image forming device according to a fourth embodiment of the invention. FIG. 7 is a view showing the arrangement of the concavo-convex shapes of a lenticular lens in the two dimensional image forming device shown in FIG. 6. The back surface shown in FIG. 7 shows the surface of a lenticular lens 10c, that is, a state when viewed from the rod integrator 4 side.

In this embodiment, two lenticular lenses are formed as the lenticular lens 10c by forming smooth concavo-convex shapes like a corrugated plate on the circular ring areas on the surface (the surface on the rod integrator 4 side) and on the back surface (the surface on the laser light source 1 side) of the circular disc substrate. The optical axis directions are disposed so as to cross each other at right angles as is shown in FIG. 7. The direction of the concavo-convex shapes on the surface and the back surface of the lenticular lens 10c is set to incline by 45 degrees with respect to the radial direction (a direction indicated by a broken line in FIG. 7) of the lenticular lens 10c (the direction of the concave-convex shapes on the surface inclines by 45 degrees in a clockwise direction and the direction of the concave-convex shapes on the back surface inclines by 45 degrees in a counterclockwise direction when viewed from the rod integrator 4 side). The lenticular lens 10c is rotated in-plane about the center of the circular disc substrate as the center of rotations (rotating shaft RA) by a driving portion 3c formed of a motor or the like. Because the rest is the same as the two dimensional image forming device shown in FIG. 4 and FIG. 5, like portions are labeled with like reference numerals and detailed description thereof are omitted herein.

According to the configuration as above, a light beam is deflected in the horizontal direction by the lenticular lens on the surface of the lenticular lens 10c and deflected in the vertical direction by the lenticular lens on the back surface. As a consequence, the exiting direction of light exiting from the lenticular lens 10c is deflected two dimensionally.

According to the configurations described above, in the two dimensional image forming device of this embodiment, not only is it possible to reduce the number of components because the lenticular lens 10c is formed of a single substrate, but it is also possible to make the driving portion 3c serving as the rotating mechanism simpler because the single rotating shaft RA is used commonly to rotate the lenticular lens 10c.

In addition, in this embodiment, a direction (a direction indicated by a broken line in FIG. 6) linking the rotating shaft RA of the lenticular lens 10c and a point BI at which a light beam comes incident on the lenticular lens 10c is set in a direction inclined by 45 degrees with respect to the rod integrator 4. Also, an incident light beam is set so as to become linearly polarized light whose deflection direction is in the horizontal direction or the vertical direction. According to such a configuration, it is possible to achieve an optical system having a small loss in which the polarization direction of a light beam deflected on the lenticular lens 10c does not change and no unwanted polarization components going incident on the two dimensional spatial light modulation element 7 are generated.

FIFTH EMBODIMENT

Figure 8:
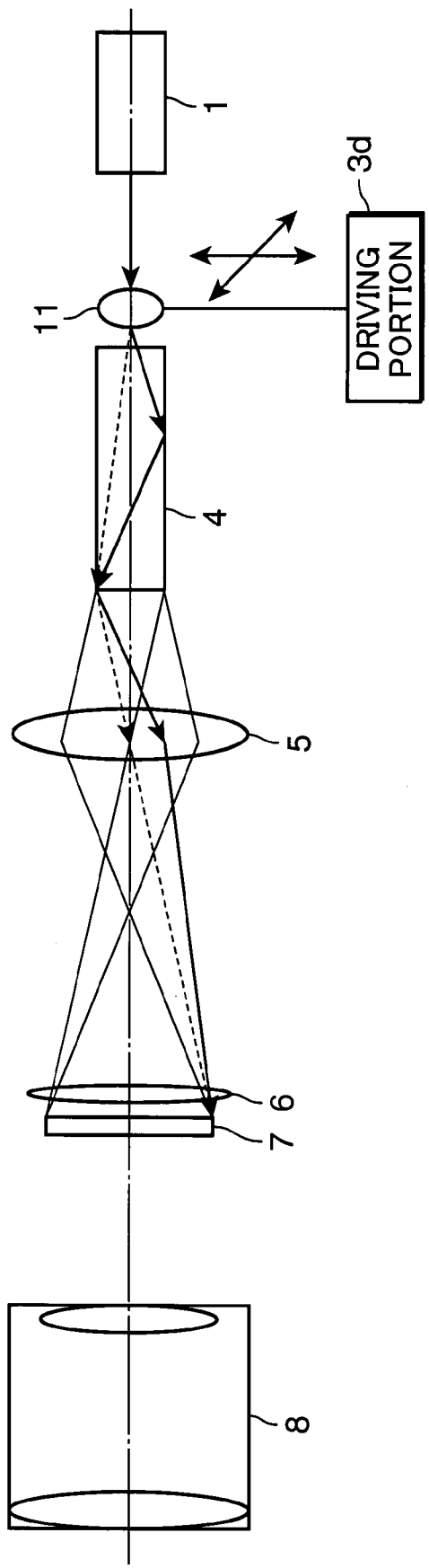
FIG. 8 is a view schematically showing the configuration of a two dimensional image forming device according to a fifth embodiment of the invention.

FIG. 8 is a view schematically showing the configuration of a two dimensional image forming device according to a fifth embodiment of the invention. In this embodiment, a normal rotationally symmetric lens 11 is used instead of the lenticular lens. Because the rest is the same as the two dimensional image forming device shown in FIG. 1, like portions are labeled with like reference numerals and detailed description thereof are omitted herein.

In a case where the rotationally symmetric lens 11 is used, different from the case of using a lenticular lens, there is a need to oscillate the lens 11 in a two dimensional direction (the directions indicated by arrows in the drawing), and the lens 11 is oscillated in a two dimensional direction by a driving portion 3d formed of an XY stage or the like having a stepping motor or the like as the driving source. In this case, too, light having passed through the lens 11 is deflected in a direction along which the lens 11 is moved, and as with the case where the lenticular lens is rotated, it is possible to exert the effect of suppressing speckle noises by changing the angle of light coming incident on the two dimensional spatial light modulation element 7. In addition, because the two dimensional image forming device of this embodiment can use the lens 11 of a size smaller than the lenticular lens, it has an effect that an optical system of a small size can be achieved.

SIXTH EMBODIMENT

Figure 9:
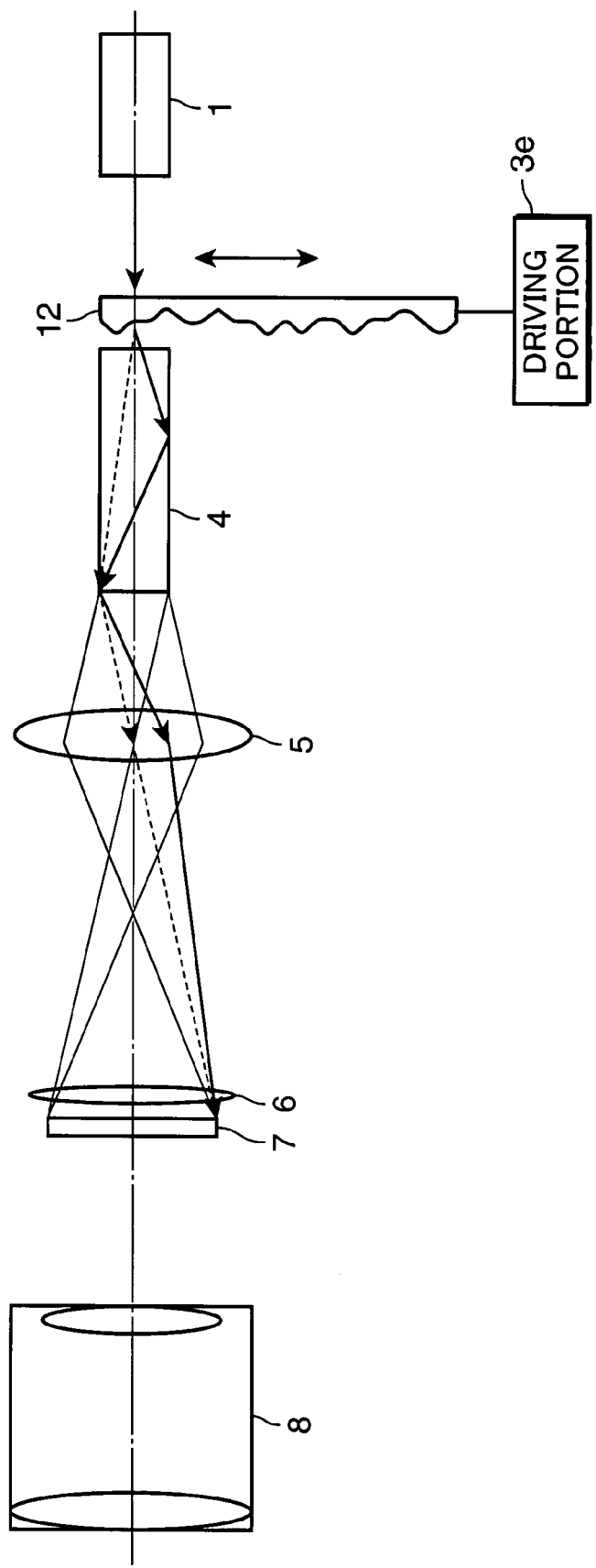
FIG. 9 is a view schematically showing the configuration of a two dimensional image forming device according to a sixth embodiment of the invention.

FIG. 9 is a view schematically showing the configuration of a two dimensional image forming device according to a sixth embodiment of the invention. In this embodiment, a diffusing lens 12 is used instead of the lenticular lens. Because the rest is the same as the two dimensional image forming device shown in FIG. 1, like portions are labeled with like reference numerals and detailed descriptions thereof are omitted herein.

A light beam from the laser light source 1 irradiates the diffusing plate 12 provided in the vicinity of the incident end of the rod integrator 4. The diffusing plate 12 has a random surface shape and has a function to diffuse light that passes through the same. Rays of light diffused in various angular orientations reach the exiting end of the rod integrator 4 by repetitively undergoing total reflection in the rod integrator 4, and irradiate the two dimensional spatial light modulation element 7 by way of the projection optical system 5. In this optical system, too, as with the optical system using beam deflection means, such as a lenticular lens, light irradiating the two dimensional spatial light modulation element 7 comes incident thereon at various angles, and there is an effect of suppressing speckle noises. In other words, by oscillating the diffusing plate 12 by means of a driving portion 3e, the patterns of speckle noises being generated are changed at a high speed, so that the speckle noise patterns that changes at a high speed are time-averaged when viewed and acknowledged as a noiseless image.

Also, by placing the diffusing surface of the diffusing plate 12 in close proximity to the incident end of the rod integrator 4, it is possible to allow exiting light from the diffusing plate 12 to go incident on the rod integrator 4 without generating any loss. It is thus possible to achieve an optical system having a small loss of light. In addition, by controlling the surface shape, such as the depth of the concaves and the convexes and the granularity of the diffusing plate 12, the angle of diffusion of light can be controlled. By controlling the angle of incidence of light coming incident on the two dimensional spatial light modulation element 7 in this manner, it is possible to achieve an optical system having a small loss of light resulting from the eclipse on the projection lens 8.

In this embodiment, because the diffusing plate 12 is used as the beam deflection means, it is possible to lower the oscillation speed of the diffusing plate 12. Normally, the size of the lenticular lens is about 0.5 to 5 mm, whereas the diffusing plate 12 has a granular surface shape of 5 μm to 50 μm. Hence, the oscillation speed of the diffusing plate 12 needed to change the speckle noises at a sufficiently high speed for the speckle noises generated on the screen to be time-averaged when viewed is only about one tenth of the oscillation speed of the lenticular lens. According to an experiment, when the diffusing plate 12 was oscillated at 5 mm/sec, a noiseless image with speckle noises being suppressed in a satisfactory manner was observed.

Figure 10:
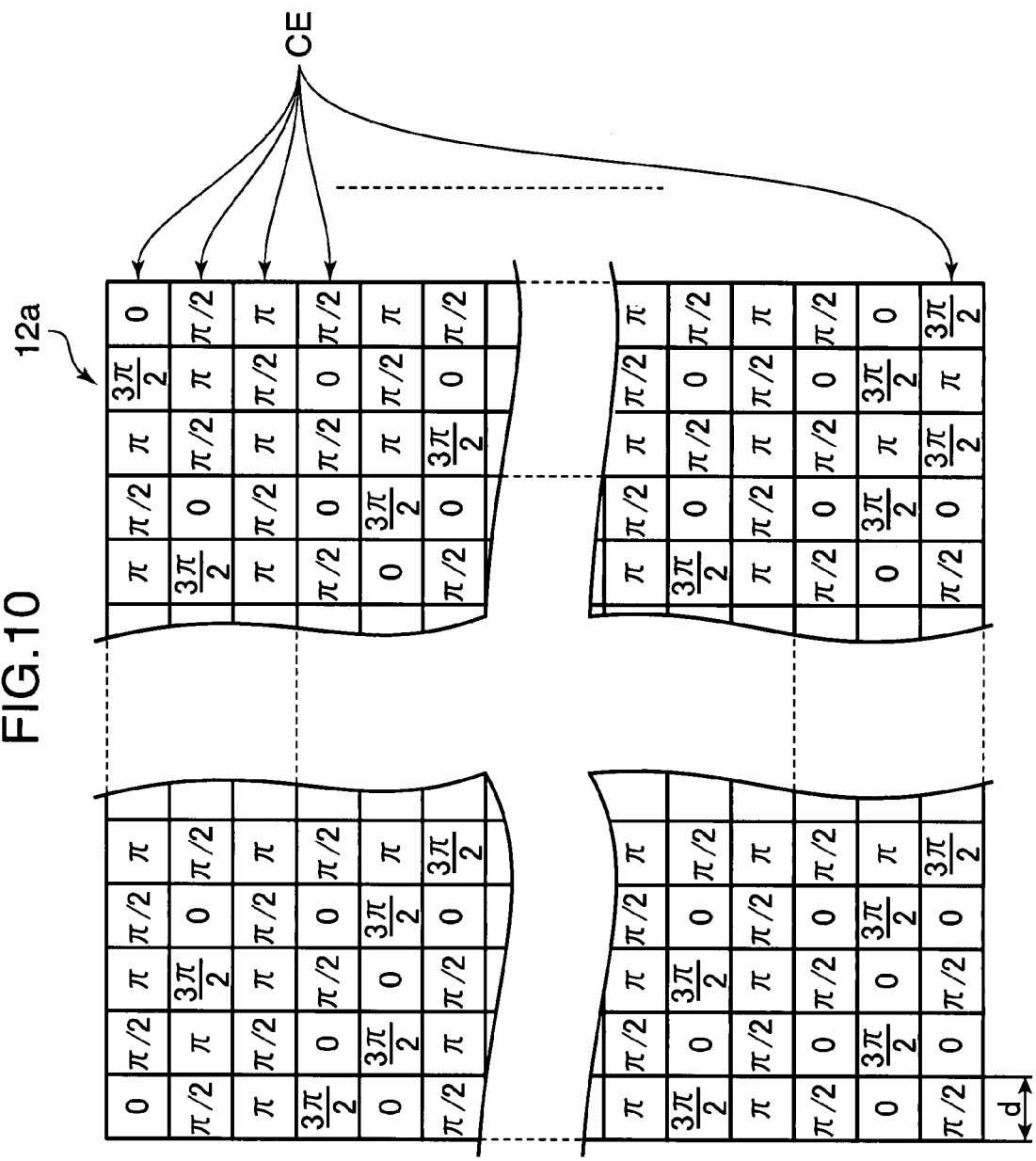
FIG. 10 is a view showing the plane configuration of a pseudorandom diffusing plate used in the two dimensional image forming device shown in FIG. 9.

The diffusing plate used in this embodiment is not particularly limited to the example described above, and a pseudo-random diffusing plate 12a as shown in FIG. 10 can be used as well. In this case, there is an effect of reducing a loss of light further. In contrast to the diffusing plate that is manufactured typically by randomly roughening the surface of a transparent substrate, such as glass and resin, the pseudorandom diffusing plate 12a shown in FIG. 10 is manufactured by providing lattice-shaped concaves and convexes on the surface of the transparent substrate. The surface of the pseudorandom diffusing plate 12a is divided into two dimensional lattice-shaped cells CE, and the depths of the concaves and convexes are set so that the phase of light passing through each cell CE undergoes transition randomly. Herein, λ/(n−1) is given as the largest width.

The advantage of using the pseudorandom diffusing plate 12a of FIG. 10 is the ability to strictly control the angle of diffusion of light passing through the pseudorandom diffusing plate 12a by the size of the cell CE. In short, let d be the cell pitch and θ be the angle of the lattice-shaped cells CE, then light is diffused with the intensity distribution expressed as:

$$I(\theta) = \{\sin(\alpha)/\alpha\}^2 (\alpha = \theta \times d/(\pi \cdot \lambda)).$$

For example, in order to manufacture a diffusing plate having 10 degrees as the full angle at half maximum of the angle of diffusion, given $I(\theta) = \frac{1}{2}$ in the equation above, then the cell pitch d with respect to the wavelength λ is obtained. In a case where light sources respectively having =0.473, 0.532, and 0.640 μm as the wavelengths for blue, green, and red are used, the diffusing plates are manufactured to respectively have the cell pitches d of 2.4, 2.7, and 3.2 μm.

Because the surface shape is random with a normal diffusing plate, there are problems as follows: (1) the angle of diffusion varies locally from place to place and efficiency for light utilization is reduced; (2) the transmittance varies from place to place and intensity distribution irregularities occur in an image; and (3) it is difficult to manufacture the diffusing plate in a stable manner to have a constant angle of diffusion. Also, when the angle of scattering is set larger, the normal diffusing plate has a problem that the deflection direction is disturbed. The pseudorandom diffusing plate 12a of FIG. 10 is able to solve these problems.

With the pseudorandom diffusing plate 12a of FIG. 10, the concavo-convex patterns can be formed on the glass plate by the photolithography method and the etching method used normally in the semiconductor process. In this instance, by choosing the phase transition to 0, π/2, π, 3π/2 as in FIG. 10, manufacturing can be completed with ease by repeating, etching twice to correspond to the phase transitions at $\pi/2$ and $\pi$.

SEVENTH EMBODIMENT

Figure 11:
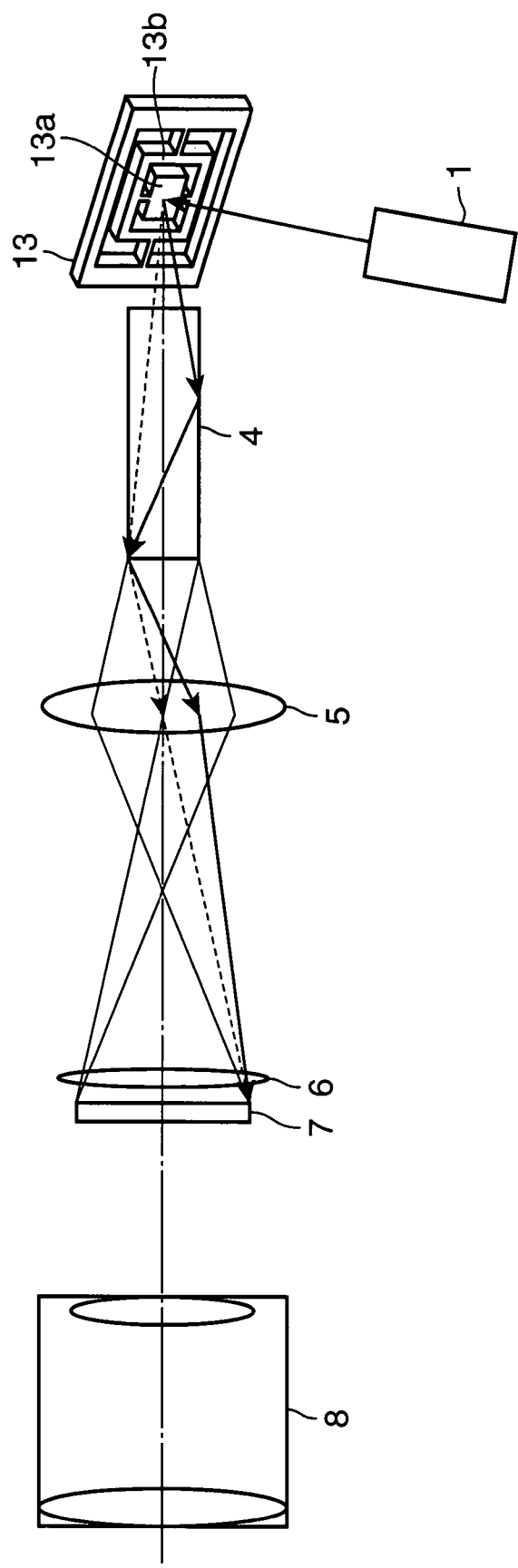
FIG. 11 is a view schematically showing the configuration of a two dimensional image forming device according to a seventh embodiment of the invention.

FIG. 11 is a view schematically showing the configuration of a two dimensional image forming device according to a seventh embodiment of the invention. The respective embodiments above described the configuration using, as the beam deflection means, devices using refraction of light, such as the prism array 2, the lenticular lenses 10a through 10c, the lens 11, and the diffusing plate 12. However, the same operations are possible using a movable mirror formed of a mirror serving as the beam deflection means and a driving portion serving as driving means for driving the mirror. In this embodiment, an MEMS (Micro Electro Mechanical Systems) mirror 13 is used as an example of the movable mirror instead of the lenticular lens. Because the rest is the same as the two dimensional image forming device shown in FIG. 1, like portions are labeled with like reference numerals and detailed descriptions thereof are omitted herein.

The two dimensional MEMS mirror 13 is a movable mirror made of silicon crystals having a thickness of about 10 μm, and a center mirror portion 13a is held at a position afloat from the bottom surface substrate by the etching technique. The center mirror portion 13a is connected to a mirror holding portion 13b in a top-bottom direction by beams. Also, the mirror holding portion 13b is supported on the beams in a right-left direction.

Electrodes (not shown in the drawing) divided to the right and the left are formed on the bottom surface substrate below the center mirror portion 13a. By applying a voltage between the center mirror portion 13a and the electrodes on the bottom surface substrate, the center mirror portion 13a inclines in a direction in which the center mirror portion 13a twists the beams due to an induced electrostatic force, that is, in the right-left direction about the top-bottom rotating axis. Electrodes (not shown in the drawing) divided at top and bottom are formed on the bottom surface substrate corresponding to the mirror holding portion 13b. By applying a voltage between the mirror holding portion 13b and the electrodes on the bottom surface substrate, the mirror holding portion 13b inclines in a direction in which the mirror holding portion 13b twists the beams due to an induced electrostatic force, that is, in the top-bottom direction about the right-left rotating axis. By controlling the inclinations in the both axial directions at the same time, it is possible to set the inclination of the center mirror portion 13a freely in the two dimensional direction.

Because the size of the center mirror portion 13a is as small as about 1 mm square and the torque is small, too, it is possible to increase the primary resonance frequency in the twisted direction by the design of the thickness and the width of the beams portions. It is thus possible to achieve a high primary resonance frequency with ease at the center of the rotating shaft in the right-left direction. When 1 mm square was given as the center mirror portion 13a, 50 μm as the width of the beams, and 200 μm as the length of the beams, then the primary resonance frequency was about 15 kHz and the resonance frequency in the Y direction was about 4 kHz, and it was possible to deflect a light beam at a sufficiently high frequency.

According to the configuration described above, because it is possible to control the angle of deflection of a light beam precisely by the MEMS mirror 13 in this embodiment, neither light eclipsed at the pupil of the projection lens 8 nor light irradiating the outside of the image frame of the two dimensional spatial light modulation element 7 only to be lost is generated. It is thus possible to achieve an optical system having an extremely small loss of light.

EIGHTH EMBODIMENT

Figure 12:
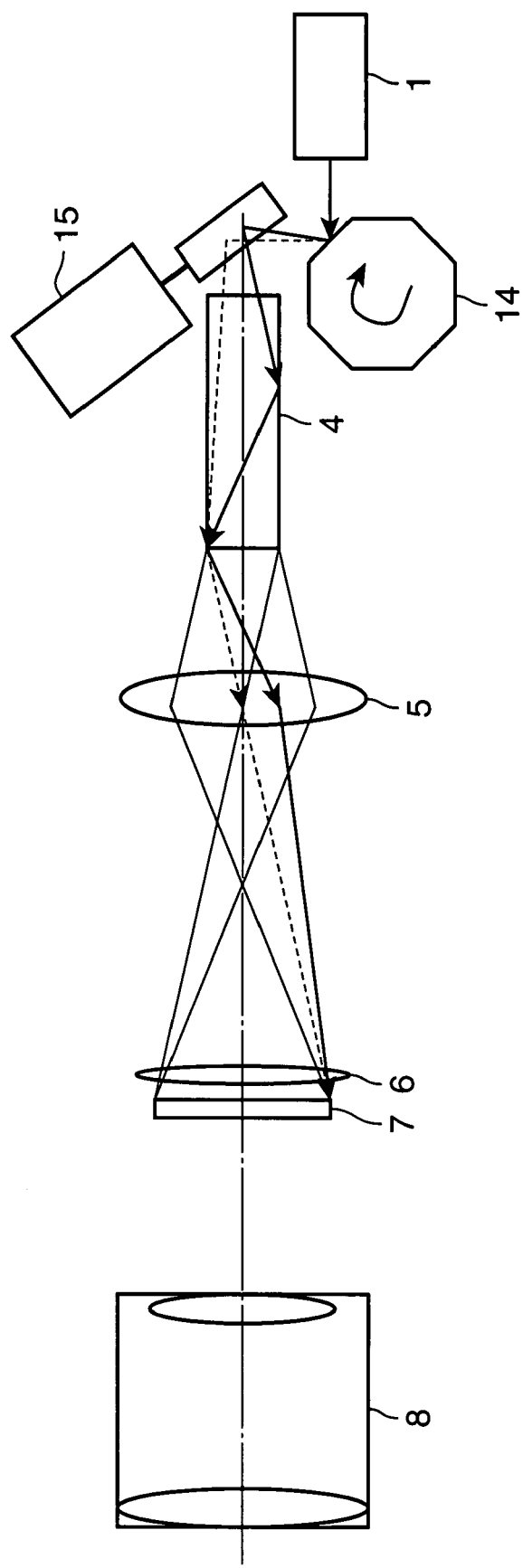
FIG. 12 is a view schematically showing the configuration of a two dimensional image forming device according to an eighth embodiment of the invention.

FIG. 12 is a view schematically showing the configuration of a two dimensional image forming device according to an eighth embodiment of the invention. In the embodiment described above, the MEMS mirror 13 was used as the movable mirror. However, the same operations are possible using a polygon mirror and a galvanometer mirror. In this embodiment, a polygon mirror 14 and a galvanometer mirror 15 are used as an example of the movable mirror instead of the lenticular lens. Because the rest is the same as the two dimensional image forming device shown in FIG. 1, like portions are labeled with like reference numerals and detailed descriptions thereof are omitted herein.

The polygon mirror 14 reflects a light beam emitted from the laser light source 1 to be deflected in the X direction and the galvanometer mirror 15 further reflects the light beam reflected on the polygon mirror 14 to be deflected in the Y direction (a direction orthogonal to the X direction), thereby performing two dimensional beam deflection.

According to the configuration described above, because it is possible to control the angle of deflection of a light beam precisely by the polygon mirror 14 and the galvanometer mirror 15 in this embodiment, too, neither light eclipsed at the pupil of the projection lens 8 nor light irradiating the outside of the image frame of the two dimensional spatial light modulation element 7 only to be lost is generated. It is thus possible to achieve an optical system having an extremely small loss of light.

NINTH EMBODIMENT

Figure 13:
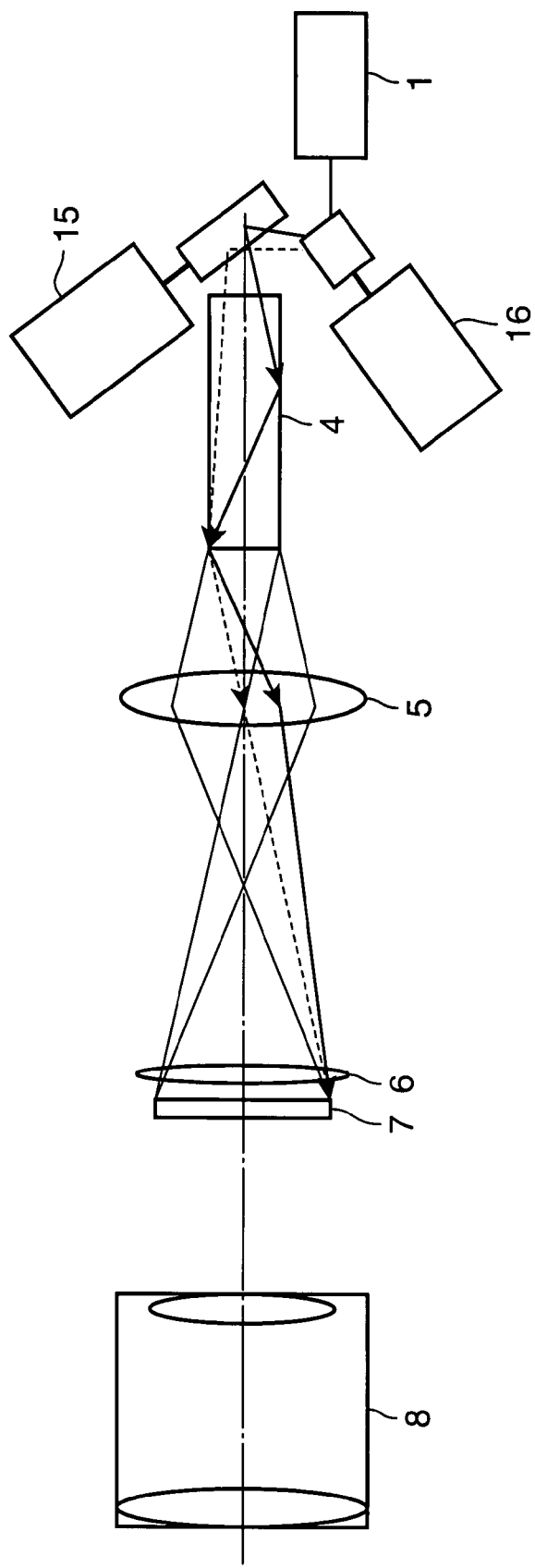
FIG. 13 is a view schematically showing the configuration of a two dimensional image forming device according to a ninth embodiment of the invention.

FIG. 13 is a view schematically showing the configuration of a two dimensional image forming device according to a ninth embodiment of the invention. In the embodiment described above, the polygon mirror 14 and the galvanometer mirror 15 were used as the movable mirror. However, the same operations are possible using two galvanometer mirrors. In this embodiment, two galvanometer mirrors 15 and 16 are used as an example of the movable mirror instead of the lenticular lens. Because the rest is the same as the two dimensional image forming device shown in FIG. 1, like portions are labeled with like reference numerals and detailed descriptions are omitted herein.

The galvanometer mirror 16 reflects a light beam emitted from the laser light source 1 to be deflected in the X direction, and the galvanometer mirror 15 further reflects the light beam reflected on the galvanometer mirror 16 to be deflected in the Y direction, thereby performing two dimensional beam deflection.

According to the configuration described above, because it is possible to control the angle of deflection of a light beam precisely using the galvanometer mirrors 15 and 16 in this embodiment, too, neither light eclipsed at the pupil of the projection lens 8 nor light irradiating the outside of the image frame of the two dimensional spatial light modulation element 7 only to be lost is generated. It is thus possible to achieve an optical system having an extremely small loss of light. Two galvanometer mirrors are used in this embodiment. However, the same effect can be achieved using two polygon mirrors instead.

TENTH EMBODIMENT

Figure 14:
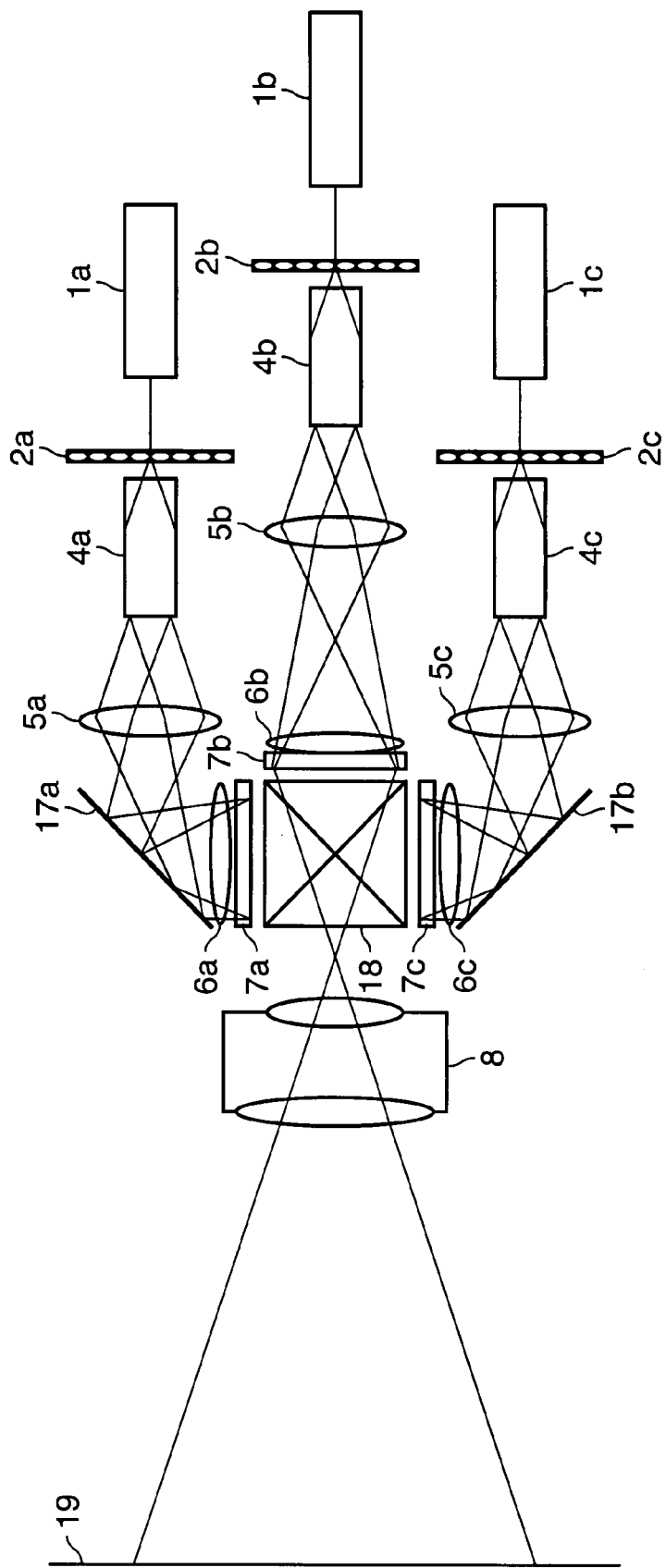
FIG. 14 is a view schematically showing the configuration of a two dimensional image forming device according to a tenth embodiment of the invention.

FIG. 14 is a view schematically showing the configuration of a two dimensional image forming device according to a tenth embodiment of the invention. In the respective embodiments described above, a single light source is used. However, the invention is also applicable to a case where a full-color image is formed using respective laser light sources for red, green, and blue. In this embodiment, a color image is displayed using a red laser light source 1a, a green laser light source 1b, and a blue laser light source 1c.

Light beams respectively emitted from the red laser light source 1a, the green laser light source 1b, and the blue laser light source 1c pass through prism arrays 2a through 2c, and rod integrators 4a through 4c, respectively, and become beams having an uniform intensity distribution at the exiting end faces of the rod integrator 4a through 4c, respectively. As with the first embodiment, driving portions that rotate the respective prism arrays 2a through 2c are provided to the prism arrays 2a through 2c. However, they are omitted in FIG. 14 for ease of illustration.

A light beam exiting from the rod integrator 4a is reflected on a mirror 17a by way of a projection optical system 5a and irradiates a two dimensional spatial light modulation element 7a via a field lens 6a. A light beam exiting from the rod integrator 4b is guided to a field lens 6b by way of a projection optical system 5b and irradiates a two dimensional spatial light modulation element 7b. A light beam exiting from the rod integrator 4c is reflected on a mirror 17c by way of a projection optical system 5c and irradiates a two dimensional spatial light modulation element 7c via a field lens 6c.

A dichroic prism 18 has the capability of reflecting red light coming incident from above in the drawing to the leftward direction, reflecting blue light coming incident from below in the drawing to the leftward direction in the drawing, and allowing green light coming incident from the right in the drawing to pass through. Images on the three two dimensional spatial light modulation elements 7a through 7c are all projected onto a screen 19 by the projection lens 8 so as to be superimposed one on another. In this instance, video signals corresponding to red, green, and blue are inputted into the three two dimensional spatial light modulation elements 7a through 7c, respectively, and a full-color video is display on the screen 19.

According to the configuration described above, in this embodiment, not only is it possible to achieve the same effect as that in the first embodiment, but it is also possible to display a full-color video. Further, because the projection lens 8 is used in common for rays of light of the respective colors, the number of components can be reduced. In this embodiment, prism arrays are used as the beam deflection means. However, other beam deflection means, such as lenticular lenses, diffusing plates, rotationally symmetric lenses, galvanometer mirrors, and polygon mirrors, may be used as well.

ELEVENTH EMBODIMENT

Figure 15:
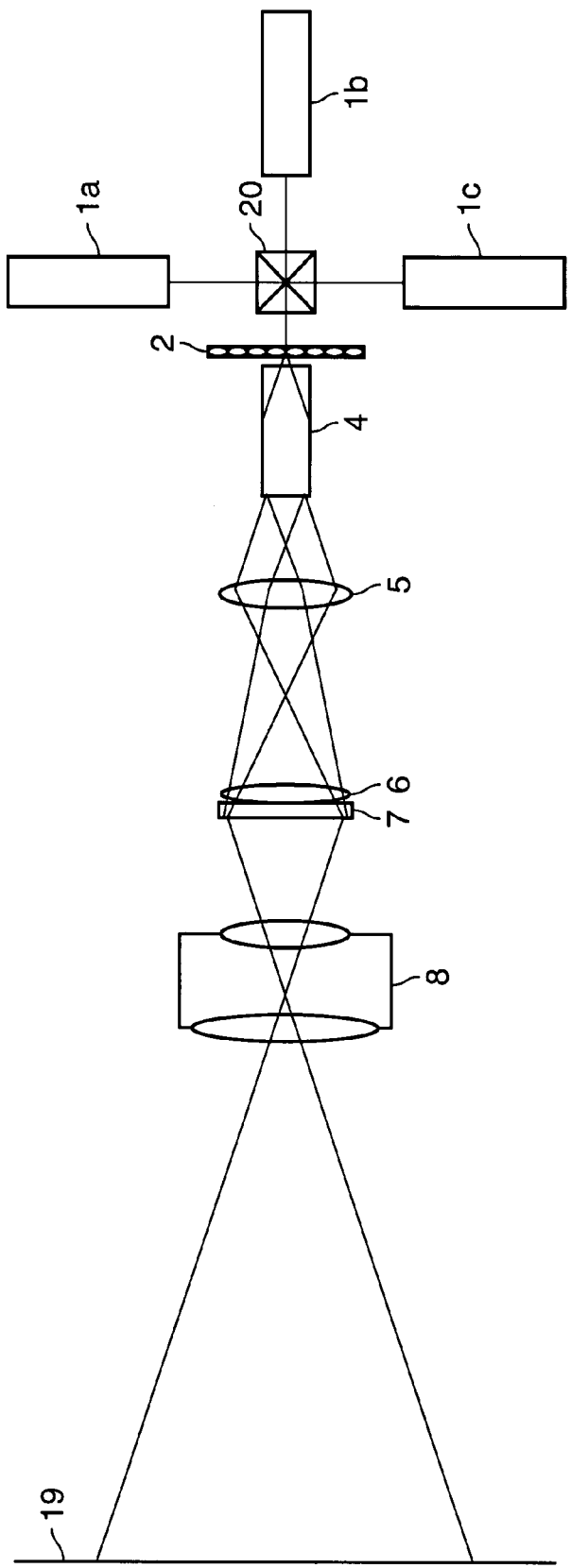
FIG. 15 is a view schematically showing the configuration of a two dimensional image forming device according to an eleventh embodiment of the invention.

FIG. 15 is a view schematically showing the configuration of a two dimensional image forming device according to an eleventh embodiment of the invention. In this embodiment, a color image is displayed by providing a dichroic prism 20 in front of the prism array 2 on the incident side and using a red laser light source 1a, a green laser light source 1b, and a blue laser light source 1c.

Respective light beams emitted from the red laser light source 1a, the green laser light source 1b, and the blue laser light source 1c are combined in the dichroic prism 20 before they go incident on the prism array 2 and the rod integrator 4, so that the light beams for all colors travel the same optical path and go incident on the prism array 2 to be deflected. As with the first embodiment, a driving portion that drives the prism array 2 is provided to the prism array 2. However, it is omitted in FIG. 15 for ease of illustration.

The light beams deflected at the prism array 2 are then converted to light beams having a uniform intensity distribution by the rod integrator 4, and the respective light beams behave in the same manner as in the first embodiment until they reach the screen 8. This embodiment is different from the first embodiment in that it adopts the control method called sequential lighting as will be described below.

Video signals for red, green, and blue are sequentially switched to be inputted into the two dimensional spatial light modulation element 7, and the red laser light source 1a, the green laser light source 1b, and the blue laser light source 1c are lit ON sequentially in synchronization with the respective video signals. Consequently, videos in the respective colors are projected sequentially on the screen 19. By switching the video signals at a high speed so that red, green, and blue are light ON several times within one frame in this manner, videos in the respective colors are viewed while they are superimposed one on another and a full-color image is perceived.

This embodiment can achieve the same effect as that in the tenth embodiment, and because the number of optical components is reduced by using the prism array 2, the driving portion, the rod integrator 4, the projection lens 5, the field lens 6, and the two dimensional spatial light modulation, element 7 in common for red, green, and blue, it also achieves the effect of enabling a full-color video display using a compact configuration.

The respective embodiments described above described the case of a projection-type display having the projection optical system 5 and the screen separately. The invention, however, is also applicable to a rear projection-type two dimensional image forming device in which the projection optical system 5 and a transmissive screen are combined. Also, the description was given using a projection device for a color image as an example. The invention, however, is also usable as an image projection device using a monochromatic laser, for example, a semiconductor exposing device.

As has been described above, a two dimensional image forming device of the invention is characterized by including: at least one laser light source; beam deflection means for changing a traveling direction of a light beam emitted from the laser light source; driving means for driving the beam deflection means to change timewise a traveling direction of the light beam exiting from the beam deflection means; a rod integrator that guides the light beam deflected by the beam deflection means to an exiting end thereof while allowing the light beam to undergo internal reflection; a first projection optical system that projects the light beam exiting from the rod integrator; a two dimensional spatial light modulation element that modulates the light beam exiting from the first projection optical system; and a second projection optical system that projects light exiting from the two dimensional spatial light modulation element onto a specific plane.

In this two dimensional image forming device, a light beam emitted from the laser light source is deflected at a time-varying angle by the beam deflection means and the driving means, and the deflected light beam is guided to the exiting end while undergoing internal reflection in the rod integrator.

The light beam exiting from the rod integrator is projected onto the two dimensional spatial light modulation element by the first projection optical system, and light exiting from the two dimensional spatial light modulation element is projected onto a specific plane by the second projection optical system. In this instance, because a light beam can be deflected at a time-varying angle by the beam deflection means disposed between the laser light source and the rod integrator without having to dispose a diffusing plate immediately in front of the two dimensional spatial light, modulation element, it is possible to lessen light that irradiates the outside of the image frame of the two dimensional spatial light modulation element only to be lost. It is thus possible to reduce speckle noises using an optical system having an extremely small loss of light. Also, because the intensity distribution of a light beam is made constant using a rod integrator of a small size without expanding a light beam emitted from the laser light source, there is no need to use a beam expander and a light integrator of a large size, which can in turn reduce the optical system in size. Hence, not only can speckle noises be reduced, but also a loss of light can be lessened, and further, it is possible to reduce the optical system in size.

It is preferable that the beam deflection means includes a prism array in which microscopic prisms are arrayed two dimensionally. In this case, because the angle of deflection of a light beam can be controlled precisely by the prism array, it is possible to lessen light eclipsed at the pupil of the lens in the second projection optical system and light irradiating the outside of the image frame of the two dimensional spatial light modulation element only to be lost. It is thus possible to achieve an optical system having an extremely small loss of light.

It is preferable that the beam deflection means includes a lenticular lens having optical axes disposed to be substantially orthogonal to each other. In this case, because the angle of deflection of a light beam can be controlled precisely by the lenticular lens, it is possible to lessen light eclipsed at the pupil of the lens in the second projection optical system and light irradiating the outside of the image frame of the two dimensional spatial light modulation element only to be lost. It is thus possible to achieve an optical system having an extremely small loss of light. In addition, because the surface shape of the lenticular lens is smooth, different from the prism, light does not scatter on the boundary line. It is thus possible to achieve an optical system having a further smaller loss of light.

It is preferable that the lenticular lens includes a first substrate on which is formed a first lenticular lens that deflects, in a horizontal direction, the light beam exiting from the beam deflection means, and a second substrate on which is formed a second lenticular lens that deflects, in a vertical direction, the light beam exiting from the beam deflection means. In this case, because the polarization direction of light passing through the first and second lenticular lenses does not change, it is possible to allow linearly polarized light to go incident on the two dimensional spatial light modulation element with a small loss by suppressing the generation of unwanted polarization components. It is thus possible to achieve an optical system having a further smaller loss.

It may be configured in such a manner that the lenticular lens includes a substrate, on one of surfaces of which is formed a first lenticular lens that deflects, in a horizontal direction, the light beam exiting from the beam deflection means and on the other surface of which is formed a second lenticular lens that deflects, in a vertical direction, the light beam exiting from the beam deflection means. In this case, because the polarization direction of light passing through the lenticular lens does not change, it is possible to allow linearly polarized light to go incident on the two dimensional spatial light modulation element with a small loss by suppressing the generation of unwanted polarization components. It is thus possible to achieve an optical system having a further smaller loss. Moreover, because the lenticular lens can be formed of a single substrate, not only can the number of components be reduced, but also the configuration of the driving means can be simpler.

It is preferable that the beam deflection means includes a diffusing plate. In this case, because a light beam can be deflected at a time-varying angle by disposing the diffusing plate between the laser light source and the rod integrator without having to dispose the diffusing plate immediately in front of the two dimensional spatial light modulation element, it is possible to lessen light that irradiates the outside of the image frame of the two dimensional spatial light modulation element only to be lost. It is thus possible to achieve an optical system having a small loss of light.

It is preferable that the diffusing plate is formed of a pseudorandom diffusing plate. In this case, not only is it possible to lessen light that irradiates the outside of the image frame of the two dimensional spatial light modulation element only to be lost, but it is also possible to lessen light eclipsed at the pupil of the lens in the second projection optical system. It is thus possible to achieve an optical system having a further smaller loss of light.

It is preferable that the beam deflection means includes a lens. In this case, because the angle of deflection of a light beam can be controlled precisely by driving the lens two dimensionally, it is possible to lessen light eclipsed at the pupil of the lens in the second projection optical system and light irradiating the outside of the image frame of the two dimensional spatial light modulation element only to be lost. It is thus possible to achieve an optical system having an extremely small loss of light. In addition, because a lens of a size smaller than the lenticular lens is used, it is possible to achieve a further smaller optical system.

It is preferable that the beam deflection means and the driving means include a movable mirror that drives the mirror two dimensionally. In this case, because the angle of deflection of a light beam can be controlled precisely by the movable mirror that drives the mirror two dimensionally, it is possible to lessen light eclipsed at the pupil of the lens in the second projection optical system and light irradiating the outside of the image frame of the two dimensional spatial light modulation element only to be lost. It is thus possible to achieve an optical system having an extremely small loss of light. In addition, in a case where an MEMS mirror is used as the movable mirror, because the MEMS mirror is extremely small in comparison with the lenticular lens, it is possible to achieve a further smaller optical system.

It is preferable that the two dimensional spatial light modulation element is a reflective two dimensional spatial light modulation element. In this case, because the need to provide the diffusing plate in front of the reflective two dimensional spatial light modulation element is eliminated, it is possible to prevent a drop in amount of light.

It is preferable that the laser light source includes three laser light sources that respectively generate blue light, green light, and red light, and that the beam deflection means, the rod integrator, the first projection optical system, and the two dimensional spatial light modulation element are disposed individually for each of the three laser light sources. In this case, not only can a full-color video be displayed, but also the number of the components can be reduced because the second projection optical system can be used in common for rays of light of respective colors.

It may be configured in such a manner that: the laser light source includes three laser light sources that respectively generate blue light, green light, and red light; light combining means for combining rays of light from the three laser light sources is further included; and the rays of light combined in the light combining means go incident on the beam deflection means. In this case, not only can a full-color video be displayed, but also the number of the components can be reduced because the beam deflection means, the driving means, the rod integrator, the first projection optical system, the two dimensional spatial light modulation element, and the second projection optical system can be used in common for rays of light of respective colors.

A two dimensional image forming device of the invention has an effect of reducing speckle noises using an optical system that does not generate light irradiating the outside of the image frame of a two dimensional spatial light modulation element only to be lost and thereby has an extremely small loss of light, and is useful as a two dimensional image forming device or the like using a coherent light source as the light source.

The invention claimed is:

1. A two dimensional image forming device, comprising:
   at least one laser light source;
   a beam deflection portion that changes a traveling direction of a light beam emitted from said laser light source;
   a driving portion for driving said beam deflection portion to change timewise a traveling direction of the light beam exiting from said beam deflection portion;
   a rod integrator that guides the light beam deflected by said beam deflection portion to an exiting end thereof while allowing the light beam to undergo internal reflection;
   a first projection optical system that projects the light beam exiting from said rod integrator;
   a two dimensional spatial light modulation element that modulates the light beam exiting from said first projection optical system; and
   a second projection optical system that projects light exiting from said two dimensional spatial light modulation element onto a specific plane,
   wherein said beam deflection portion includes a lenticular lens having optical axes disposed to be substantially orthogonal to each other and deflecting the light beam exiting from said beam deflection portion in a horizontal direction and a vertical direction.

2. The two dimensional image forming device according to claim 1, wherein the lenticular lens includes:
   a first substrate on which is formed a first lenticular lens that deflects, in a horizontal direction, the light beam exiting from said beam deflection portion; and
   a second substrate on which is formed a second lenticular lens that deflects, in a vertical direction, the light beam exiting from said beam deflection portion.

3. The two dimensional image forming device according to claim 1, wherein:
   the lenticular lens includes a substrate, on one of surfaces of which is formed a first lenticular lens that deflects, in a horizontal direction, the light beam exiting from said beam deflection portion and on the other surface of which is formed a second lenticular lens that deflects, in a vertical direction, the light beam exiting from said beam deflection portion.

4. The two dimensional image forming device according to claim 1, wherein:
   said two dimensional spatial light modulation element is a reflective two dimensional spatial light modulation element.

5. The two dimensional image forming device according to claim 1, wherein:
   said laser light source includes three laser light sources that respectively generate blue light, green light, and red light; and
   said beam deflection portion, said rod integrator, said first projection optical system, and said two dimensional spatial light modulation element are disposed individually for each of the three laser light sources.

6. The two dimensional image forming device according to claim 1, wherein:
   said laser light source includes three laser light sources that respectively generate blue light, green light, and red light;
   light combining portion for combining rays of light from the three laser light sources is further included; and
   the rays of light combined in the light combining portion go incident on said beam deflection portion.

7. A two dimensional image forming device, comprising:
   at least one laser light source;
   a beam deflection portion that changes a traveling direction of a light beam emitted from said laser light source;
   a driving portion that drives said beam deflection portion to change timewise a traveling direction of the light beam exiting from said beam deflection portion;
   a rod integrator that guides the light beam deflected by said beam deflection portion to an exiting end thereof while allowing the light beam to undergo internal reflection;
   a first projection optical system that projects the light beam exiting from said rod integrator;
   a two dimensional spatial light modulation element that modulates the light beam exiting from said first projection optical system; and
   a second projection optical system that projects light exiting from said two dimensional spatial light modulation element onto a specific plane,
   wherein said beam deflection portion and said driving portion include a movable mirror that drives the mirror two dimensionally,
   the movable mirror includes a microelectromechanical systems mirror having a mirror holding portion supported in a right-left direction by beams and a center mirror portion connected to the mirror holding portion in a top-bottom direction by beams, and
   the microelectromechanical systems mirror controls the angle of deflection of the light beam by inclining the center mirror portion in the right-left direction and in the top-bottom direction.

* * * * *

UNITED STATES PATENT AND TRADEMARK OFFICE
CERTIFICATE OF CORRECTION

PATENT NO. : 7,646,518 B2 Page 1 of 1
APPLICATION NO. : 11/884951
DATED : January 12, 2010
INVENTOR(S) : Kenichi Kasazumi It is certified that error appears in the above-identified patent and that said Letters Patent is hereby corrected as shown below:

In Section (86) PCT No., "PCT/JP2006/003015" should read --PCT/JP2006/303015--.

Signed and Sealed this

Twenty-fifth Day of May, 2010

David J. Kappos
*Director of the United States Patent and Trademark Office*